US012643090B2

(12) United States Patent
Kawamoto et al.

(10) Patent No.: US 12,643,090 B2
(45) Date of Patent: Jun. 2, 2026

(54) GRANULATED ADSORBENT AND PROCESS OF PRODUCING THE SAME

(71) Applicants: NATIONAL INSTITUTE OF ADVANCED INDUSTRIAL SCIENCE AND TECHNOLOGY, Ibaraki (JP); FUSO Corporation, Kagawa (JP)

(72) Inventors: Tohru Kawamoto, Ibaraki (JP); Akira Takahashi, Ibaraki (JP); Kimitaka Minami, Ibaraki (JP); Hisashi Tanaka, Ibaraki (JP); Toshio Yamada, Kagawa (JP); Hiroaki Mikasa, Kagawa (JP); Hiroyuki Takahashi, Kagawa (JP); Takashi Suzaki, Kagawa (JP)

(73) Assignees: NATIONAL INSTITUTE OF ADVANCED INDUSTRIAL SCIENCE AND TECHNOLOGY, Ibaraki (JP); FUSO Corporation, Kagawa (JP)

( * ) Notice: Subject to any disclaimer, the term of this patent is extended or adjusted under 35 U.S.C. 154(b) by 460 days.

(21) Appl. No.: 18/036,175

(22) PCT Filed: Nov. 1, 2021

(86) PCT No.: PCT/JP2021/040227
§ 371 (c)(1),
(2) Date: May 10, 2023

(87) PCT Pub. No.: WO2022/102448
PCT Pub. Date: May 19, 2022

(65) Prior Publication Data
US 2023/0405554 A1 Dec. 21, 2023

(30) Foreign Application Priority Data
Nov. 10, 2020 (JP) ................................. 2020-187242

(51) Int. Cl.
| | |
|---|---|
| *B01J 20/30* | (2006.01) |
| *B01D 53/02* | (2006.01) |
| *B01J 20/02* | (2006.01) |
| *B01J 20/04* | (2006.01) |
| *B01J 20/22* | (2006.01) |
| *C02F 101/00* | (2006.01) |
| *C02F 101/16* | (2006.01) |

(52) U.S. Cl.
CPC .......... *B01J 20/3028* (2013.01); *B01D 53/02* (2013.01); *B01J 20/0229* (2013.01); *B01J 20/0237* (2013.01); *B01J 20/3021* (2013.01); *B01J 20/3042* (2013.01); *B01J 20/3085* (2013.01); *B01D 2253/112* (2013.01); *B01D 2257/406* (2013.01)

(58) Field of Classification Search
CPC .............. B01J 20/3028; B01J 20/0229; B01J 20/0237; B01J 20/3021; B01J 20/3042; B01J 20/3085; B01D 53/02
See application file for complete search history.

(56) References Cited

U.S. PATENT DOCUMENTS

| | | |
|---|---|---|
| 2015/0239758 A1 | 8/2015 | Namiki et al. |
| 2017/0096348 A1 | 4/2017 | Takahashi et al. |

FOREIGN PATENT DOCUMENTS

| | | | | |
|---|---|---|---|---|
| CN | 107952421 A | 4/2018 | | |
| CN | 111589411 A | 8/2020 | | |
| JP | 2013010087 A | 1/2013 | | |
| JP | 2013061220 A | 4/2013 | | |
| JP | 2013253963 A | 12/2013 | | |
| JP | 2014059280 A | 4/2014 | | |
| JP | 2014077720 A | 5/2014 | | |
| JP | 2015062848 A | 4/2015 | | |
| JP | 2015101523 A | 6/2015 | | |
| JP | 2019034273 A | 3/2019 | | |
| JP | 2019152525 A | 9/2019 | | |
| JP | 2020040054 A * | 3/2020 | ............. | B01J 20/02 |
| WO | 2014/010417 A1 | 1/2014 | | |

(Continued)

OTHER PUBLICATIONS

Jang et al., Bioresource Technology, (2016), v.218, p. 294-300.*
Google Search—Is polyacrylamide amphoteric?_ Sep. 24, 2025.*
Jang et al., Bioresource Technology, (2016), v.218, p. 294-300. (Priviously provided).*
Kawamoto et al., "Radioactive Cs-Polluted Ash Disposal Taking Advantage of Nanoparticles of the Prussian Blue Type Complex," National Institute of Advanced Industrial Science and Technology Material Chemistry Area, Nanomaterials Research Division, Published on Mar. 31, 2017.

(Continued)

*Primary Examiner* — Yong L Chu

(74) *Attorney, Agent, or Firm* — IP Business Solutions, LLC

(57) ABSTRACT

The purpose of the present invention is to provide a granulation adsorbent having high strength and in particular stability in water that ensures certain throughputs at low costs. The granulated adsorbent of the invention comprises a metal-cyano complex as an effective component, a flocculation precipitant for flocculation precipitation of the metal-cyano complex from slurry containing the metal-cyano complex, a binder, and a crosslinking agent. The granulated adsorbent is produced by a step of adding the flocculation precipitant to the metal-cyano complex slurry and then dehydrating the metal-cyano complex slurry to prepare a metal-cyano complex dehydrated cake, a step of heat drying the metal-cyano complex dehydrated cake to prepare a metal-cyano complex dried block, a step of pulverizing the metal-cyano complex dried block into metal-cyano complex powder, and a step of preparing a mixture containing the metal-cyano complex powder, binder and crosslinking agent, and then granulating using the mixture.

10 Claims, 7 Drawing Sheets

(56) References Cited

FOREIGN PATENT DOCUMENTS

| | | |
|---|---|---|
| WO | 2014/038713 A1 | 3/2014 |
| WO | 2015/186819 A1 | 12/2015 |

OTHER PUBLICATIONS

Takahashi et al., "Efficient synthesis of size-controlled open-framework nanoparticles fabricated with a micro-mixer: route to the improvement of Cs adsorption performance," Royal Society of Chemistry Green Chem. 17, 4228 (2015).

http://www.makino-co.eo.jp/products/kansou/kansou01/ "Product Advertisement=Aspray dryer that enables high-quality granulation".

The Chinese Office Action mailed by Chinese Patent Office dated on May 28, 2025 in corresponding Chinese patent application No. 202180075635.6.

Sinha et al. "Flocculation Studies on Freshly Precipitated Copper Ferrocyanide for the Removal of Caesium From Radioactive Liquid Waste", Waste Management., vol. 13, No. 4, pp. 341-350, Jan. 1, 1993.

The Supplementary European Search Report mailed by European Patent Office dated on Dec. 4, 2024 in corresponding European patent application No. 21 89 1695.

The Search Opinion of the European patent application No. 21 891 695.5.

* cited by examiner

GRANULATED ADSORBENT AND PROCESS OF PRODUCING THE SAME

TECHNICAL FIELD

The present invention relates to a granulated adsorbent for adsorption of small ions and/or small molecules and a process of producing the same.

BACKGROUND ART

Adsorbents have been used in various fields, particularly it is important to be used in applications for removing harmful substances or recovering beneficial substances present in trace amounts from water or the atmosphere.

For instance, adsorbents such as active carbon and zeolite are used for the purpose of removing organic materials from the atmosphere or water.

These adsorbents are characterized by having a network of microspace in them, adsorbing the materials in the microspace. The absorbed materials are then removed or recovered.

Among the adsorbents, a metal-cyano complex has been known to act as an adsorbent for adsorbing small-sized molecules or ions, and in particular known as an adsorbent for selective adsorption of radioactive cesium ions (see Patent Publication 1 and Non-Patent Publication 1) or ammonia (Patent Publications 2 and 3). The metal-cyano complex is characterized by having its microspace size smaller than that of zeolite or the like, and having a large number of metal ions in the crystal, that allows absorbing molecules by coordination bonding.

In particular, the adsorbent using a metal-cyano complex by making it into nanoparticles can enlarge its specific surface area, and improve the adsorption features (see Non-Patent Publication 2).

On the other hand, such an adsorbent in nanoparticle form has often difficulty chemical engineering handling. For instance, when a liquid or gas is passed through a column filled with small adsorbent particles, clogging or other problem may arise.

In order to solve this problem, a method of supporting a material having a large specific surface area such as a nonwoven fabric (Patent Document 4) and a method in which the adsorbent is used as a granulation adsorbent and the particle size is increased (Patent Document 5 and Patent Document 6) have been proposed. In the former method, since the amount of metal cyano complex occupying the adsorbent is relatively small, there is a problem that the adsorbent weight or the adsorption capacity per volume is small. Therefore, when processing a large amount of water/atmosphere, the latter method having a large adsorption capacity per adsorbent is preferable. In order to provide a solution to this problem, it has been proposed a method wherein the adsorbent is carried on an unwoven fabric or like having a relatively large specific surface area (Patent Publication 4) or a method wherein the adsorbent is granulated to increase its particle diameter (see Patent Publications 5 and 6). A problem with the former method is that the amount of the metal-cyano complex accounting for the adsorbent is relatively reduced with the result that there is a small adsorption capacity per weight or volume of the adsorbent. Thus, when a large amount of water or atmospheric air is treated, it is preferable to use the latter method where there is an increased adsorption capacity per adsorbent.

When only the metal cyano complex is used as a granular body, powder may fall off during use due to insufficient strength.

There are several methods proposed for granulation of metal-cyano complex, wherein the presence of a particular binder becomes significant. When only the metal-cyano complex is used in granulated form, powder may fall off due to insufficient strength during use.

As a usage of the binder, for example, Patent Publication 5 has proposed a method wherein calcium alginate formed by adding potassium alginate to a metal-cyano complex slurry followed by dropwise addition to calcium chloride is used as the binder.

Patent Publication 6 has proposed a method of adding polyvinyl alcohol (PVA) as the binder to a dry-sprayed metal-cyano complex powder followed by kneading. This method has the feature that a relatively small, spherical metal cyano complex powder of 10~50 μm can be obtained by using spray drying, and PVA as a binder can cross-link spherical powder of metal cyano complex. By this method, it can achieve both a large specific surface area and the maintenance of the strength of the granulated adsorbent.

PRIOR ART PUBLICATIONS

Patent Publications

Patent Publication 1: Unexamined Patent Publication No. 2013-253963
Patent Publication 2: International Publication No. 2015/186919
Patent Publication 3: Unexamined Patent Publication No. 2019-34273
Patent Publication 4: Unexamined Patent Publication No. 2014-59280
Patent Publication 5: Unexamined Patent Publication No. 2014-77720
Patent Publication 6: Unexamined Patent Publication No. 2020-40054
Patent Publication 7: Unexamined Patent Publication No. 2015-101523
Patent Publication 8: Unexamined Patent Publication No. 2019-152525
Patent Publication 9: International Patent Publication No. 2014/010417

Non-Patent Publications

Non-Patent Publication 1: "Radioactive Cs-Polluted Ash Disposal Taking Advantage of Nanoparticles of the Prussian Blue Type Complex", https://unit.aist.go.jp/nmri/ja/results/paper/1703. briefing%20paper%20Cs.Ash%20decotamination.180330.pdf Non-Patent Publication 2: A. Takahashi, N. Minami, H. Tanaka, K. Sue, K. Minami, D, ParajuLi, K.-M. Lee, S. Ohkoshi, M. Kurihara, and T. Kawamoto, Green Chem. 17, 4228 (2015)
Non-Patent Publication 3: http://www.makino-co.co.jp/products/kansou/kansou 01/

SUMMARY OF THE INVENTION

Subject Matter

As for the granulated adsorbent, however, there are some problems found in the methods described in these prior publications. With the method of Patent Publication 5, adsorbent strength cannot possibly be maintained in water because calcium alginate is used as the binder. For instance, when the concentration of sodium or potassium is high in water, calcium of calcium alginate is substituted with sodium or potassium, rendering it water-soluble.

For the method of Patent Publication 6, it is essentially required to prepare micro-spherical powder comprising a metal-cyano complex/water mixture (hereafter called the metal-cyano complex slurry); however, there is a problem with a very increased production cost because the size of spray-drying apparatus used therewith gets very large. In particular, such an increased production size would lead to an increased factory installation cost, etc. For instance, Non-Patent Publication 3 refers to a general spray-drying apparatus size, stating that if the amount of moisture evaporation is 10 kg/hr, it would reach approximately 7 meters× 4.5 meters×6 meters. As the metal-cyano complex slurry has a typical concentration of about 9 to 10%, output obtained by making use of the aforesaid spray-drying apparatus would remain up to 1 kg/hr. Referring further to spray-drying, the interior temperature of a drying machine may instantaneously be greater than 100° C., possibly giving a risk to rise to hydrogen cyanide generation.

In Patent Publication 7, an alternative process of preparing metal-cyano complex powder from the metal-cyano complex slurry without recourse to spray-drying is disclosed that in which the slurry is subjected to solid-liquid separation with centrifugation and dehydrated followed by drying. However, it would be difficult to treat the metal-cyano complex slurry in large quantities because it often comprises primary particles of less than 100 nanometers in diameter and high rotations of the order of 10000 rpm or more are required for centrifugation. Even with filtration making use of paper or fabric filters, there would again be a problem in terms of high throughput because of clogging caused by small sizes of primary particles.

Thus, when the metal-cyano complex is used as an adsorbent, there is mounting demand for a granulated adsorbent that is available at low cost, ensures certain throughputs, has high strength, and has stability in water in particular. In particular, referring to how to prepare powder from the metal-cyano complex slurry, any method of preparing powder in not only simple but also high-throughput way is not yet found, leading to the need of carrying out spray-drying using large equipment.

In terms of safety, it is necessary to remove the cause of heating in each manufacturing process because some cyano groups are released off from a portion of the metal-cyano complex upon heating and turn to hydrogen cyanide (see FIG. 11 of Non-Patent Publication 1).

Means for Achieving the Subject Matter

As a result of study after study made to provide a solution to the aforesaid problems, the present inventors have found that by using a specific flocculation precipitant or the like, solid-liquid separation and drying upon production as well as additives used in process steps are optimized and temperature control is carried out, arriving at the required granulated adsorbent and the process of producing the same.

The present invention has been accomplished on the basis of these findings, and carried out in the following embodiments.

[1]

A granulated adsorbent for adsorption of a small ion and/or a small molecule, that comprises a metal-cyano complex as an effective component, a binder, a crosslinking agent, and a flocculation precipitant that flocculates and precipitates the metal-cyano complex from a slurry that contains the metal-cyano complex, wherein said flocculation precipitant is an organic polymeric flocculant.

[2]

The granulated adsorbent of [1], wherein said organic polymeric flocculant is an amphoteric polymeric adsorbent.

[3]

The granulated adsorbent of [1] or [2], wherein said crosslinking agent has a function capable of crosslinking said binder by heating at not higher than 60° C.

[4]

The granulated adsorbent of [3], wherein said crosslinking agent is an organic titanium salt.

[5]

The granulated adsorbent of any of [1] to [4], wherein said binder is a water-soluble polymer.

[6]

The granulated adsorbent of [5], wherein said binder is a polyvinyl alcohol.

[7]

A process of producing a granulated adsorbent comprising a metal-cyano complex as an effective component for adsorption of a small ion and/or a small molecule, comprising:

a step of adding a flocculation precipitant to a slurry containing a metal-cyano complex and then dehydrating said slurry for preparation of a metal-cyano complex dehydrated cake, a step of drying the metal-cyano complex dehydrated cake by heating for preparation of a metal-cyano complex dried block, a step of pulverizing the metal-cyano complex dried block into a metal-cyano complex powder, and a step of preparing a mixture containing the metal-cyano complex powder, binder, crosslinking agent and water for granulation using the mixture.

[8]

The process of producing a granulated adsorbent according to [7], wherein all said steps are carried out at not higher than 70° C. for inhibition of generation of hydrogen cyanide.

[9]

The process of producing a granulated adsorbent according to [7] or [8], wherein the step of preparing the mixture is carried out by dispersing and injecting the binder and spraying the crosslinking agent without recourse to high-speed stirring.

[10]

The process of producing a granulated adsorbent according to any of [7] to [9], wherein said flocculation precipitant is an organic polymeric flocculant.

[11]

The process of producing a granulated adsorbent according to any of [7] to [10], wherein said crosslinking agent crosslinks the binder by heating at not higher than 60° C.

[12]

The process of producing a granulated adsorbent according to [11], wherein a said crosslinking agent is an organic titanium salt.

[13]

The process of producing a granulated adsorbent according to any of [7] to [12], wherein said binder is a water-soluble polymer.

[14]

The process of producing a granulated adsorbent according to [13], wherein said water-soluble polymer is a polyvinyl alcohol.

Advantages of the Invention

According to the present invention, it is possible to provide a granulated adsorbent capable of full adsorption without recourse to spray-drying or the like which otherwise gives rise to an increased installation size and, hence, an increased cost. In addition, since the temperature control during manufacturing is simplified, safety management during work is easy, it is possible to provide a cheaper and simpler method, and the obtained granulation adsorbent sufficiently retains both strength and adsorption function.

MODES FOR CARRYING OUT THE INVENTION

In what follows, some embodiments of the invention (hereafter also called the "present embodiments") will be explained; however, they are provided for explanation of the invention rather than for limitation of the scope of the present invention.

It is here understood that "to" indicative of numerical ranges includes the lower and upper limit values thereof.

Adsorbent

In the present disclosure, the "adsorbent" refers to a material adapted to capture in it small ions and small molecules contained in water and the atmosphere for removal of them from the water and the atmosphere. The thus captured small ions and small molecules may be eliminated by any desired method like water washing, and/or heating. In this case, the thus eliminated small ions and small molecules may further be reused as valuable material, and the adsorbent may in itself be returned back to a state before adsorption or to a state equivalent thereto.

In the present disclosure, the "small ion(s)" refers to an ion containing one or two atoms whose atomic number is greater than that of helium ion(s), for instance, lithium ion(s), sodium ion(s), potassium ion(s), ammonium ion(s), rubidium ion(s), cesium ion(s), and magnesium ion(s). In particular, the metal-cyano complex referred to herein has high selectivity to cesium, rubidium and ammonium ions, and may be used for removal and recovery of them, but is not limited thereto.

In the present disclosure, the "small molecule(s)" refers to a molecule containing 5 or less atoms whose atomic number is greater than that of lithium ion, for instance, ammonia, hydrogen sulfide, methyl sulfide, methyl disulfide, trimethylamine, acetaldehyde, propion-aldehyde, methanol, ethanol, propanol, and water. In particular, the metal-cyano complex referred to herein has high selectivity to ammonia, and may be used for removal and recovery of them, but is not limited thereto.

Metal-Cyano Complex

In the present embodiment(s), the metal-cyano complex is a sort of porous coordination polymer comprising a metal ion (a cation having a plus charge) and a cyano group (an anionic $CN^-$ having a minus charge) that is a sort of ligand capable of crosslinking this metal ion. The metal-cyano complex is a series of compounds called metal-cyano complex having a hexacyano-metal ion in their structure. The metal-cyano complex comprises a nanopore structure that may capture a gas of interest inside. This nanopore structure has a pore size of 0.3 to 0.6 nm. The metal-cyano complex is assembled up by a regular repetition of such nanopore structures so that it has a large surface area for highly selective and efficient adsorption and desorption of ammonia chemical species.

Figure 1:
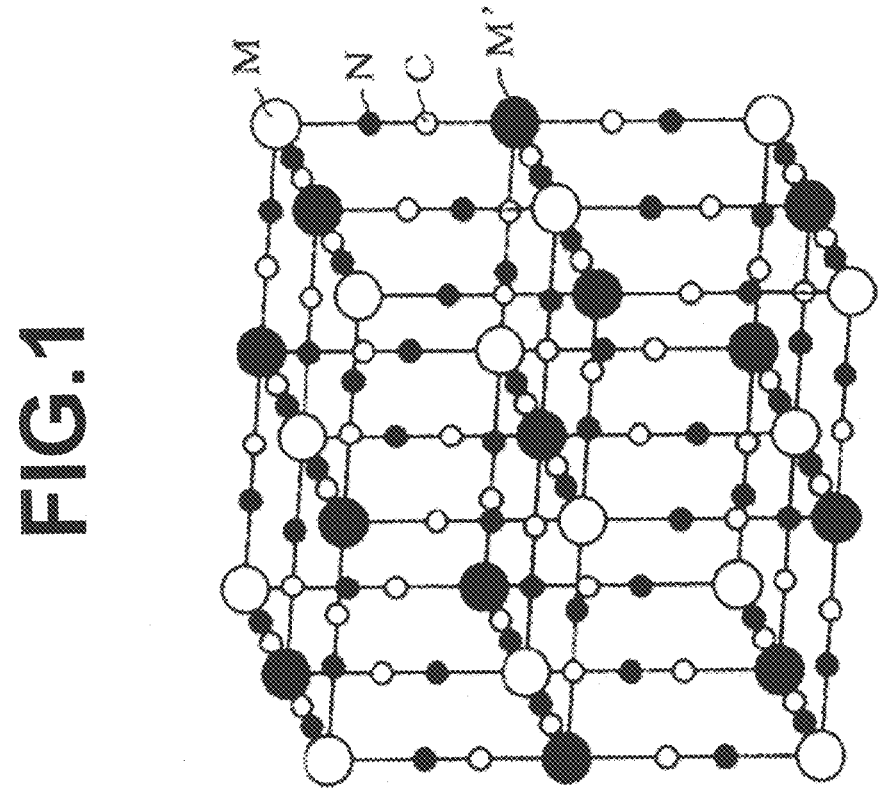
FIG. 1 shows a typical crystal structure of a metal-cyano complex.

In the present embodiment(s), the metal-cyano complex comprises a face-centered cubic structure shown in FIG. 1 as a typical crystal structure, and is expressed by the following general formula (1).

$$A_xM[M'(CN)_6]_y \cdot zH_2O \tag{1}$$

where x is 0 to 3, y is 0.1 to 1.5, z is 0 to 6, A stands for one or more cations of hydrogen, ammonium, an alkali metal, and an alkaline earth metal, and M and M' are independent from each other, standing for a cation of one or more atoms having an atomic number 3 to 83. However, it is to be noted that M and M' are in no sense the cations of A standing for a cation of hydrogen, ammonium, an alkali metal including lithium, sodium, potassium, rubidium, cesium, and francium as well as a cation of an alkaline earth metal including magnesium, calcium, strontium, barium, and radium.

A represents one or more cations of hydrogen, ammonium, an alkali metal including lithium, sodium, potassium, rubidium, cesium, and francium, and an alkaline earth metal including magnesium, calcium, strontium, barium, and radium. A may represent two or more cations in a mixed state, and x takes such a value as to keep the charge balance of the entire metal-cyano complex.

M stands for one or more metal cations of vanadium, chromium, manganese, iron, ruthenium, cobalt, rhodium, nickel, palladium, platinum, copper, silver, zinc, indium, lanthanide, europium, gadolinium, and lutetium. M may stand for two or more cations in a mixed state, they exist in the metal-cyano complex in such a way as to keep the charge balance of the entire metal-cyano complex. For M', there is the mention of one or more metal cations of vanadium, chromium, molybdenum, tungsten, manganese, iron, ruthenium, cobalt, nickel, platinum, and copper. With stability of cyanides in the PB derivative in mind, it is preferable to choose iron or cobalt for M'.

By combining M with M', it is possible to control adsorbent features such as adsorption capacity, adsorption rate, selectivity, and adsorbent material stability. Any desired M/M' combinations may be used including combinations where M is $Fe^{3+}$ and M' is $Fe^{2+}$, M is $Cu^{2+}$ and M' is $Fe^{2+}$, M is $Co^{2+}$ and M' is $Co^{3+}$, or M is $Cu^{3+}$ and M' is $Co^{2+}$.

As well known in the art, the pores or voids of the nanopore structure of the PB derivative comprising a variety of A, M and M' are capable of adsorbing $Cs^+$ having an ionic radius of 0.183 nm with high selectivity and efficiency. This is considered due to the fact that the nanopore structure surrounded by CN minus charged with one of skeletons of the metal-cyano complex is well fit for plus charged Cs ions in terms of charge and space, resulting in efficient adsorption of $Cs^+$ to the pores.

The plus charge and size of ammonium ions $NH_4^+$ that is one sort of ammonia chemical species and has an ionic radius of 0.175 nm are close to those of $Cs^+$. This is taken as one of factors allowing the metal-cyano complex to adsorb ammonia chemical species with efficiency. It is also possible to introduce defects into the PB derivative. With no defects, the metal site M is surrounded with plural cyano groups; however, the introduction of defects causes some cyano groups to be deleted resulting in a situation where various molecules are likely to be coordination bonded to the metal site M. In the atmosphere, water molecules often remain bonded to that metal site M, while ammonia, known to be more likely to coordination bond to metals than water, bonds to the metal site M by substitution with the coordinated water molecules. This is also considered as one of factors through which the metal-cyano complex is capable of adsorbing ammonia chemical species efficiently.

[Granulated Adsorbent]

In the present disclosure, the "granulated adsorbent" refers to one that is mainly composed of a metal-cyano complex capable of adsorption and that is mixed with a binder for maintaining strength and a crosslinking agent followed by granulation. The flocculation precipitant to be added upon solid-liquid separation is also included in the granulated adsorbent.

In the present invention, the binder is added to the adsorbent for the purpose of maintaining its strength through mixing with the metal-cyano complex capable of adsorption. On the other hand, the crosslinking agent cross-links between the binders by various bonds and makes the binders insoluble, thereby preventing the elution of the binder in water and the associated elution of the metal cyano complex. Further, the above materials is added for the purpose of preventing deterioration such as powder falling off and collapse of the granulation adsorbent.

[Flocculation Precipitant]

A flocculation precipitant is generally used for solid-liquid separation of a slurry that is a mixture of fine particles with water, for instance, for sewage disposal. By agglomerating fine particles to be suspended in the sewage to be treated, it prevents clogging during filtration treatment, quickly precipitates and removes supernatant, and increases the sedimentation rate during centrifugation. In this case, the flocculation precipitant added will remain on the solid side subjected to solid-liquid separation, namely, in a dehydrated cake. Therefore, the characteristic features essentially needed for the flocculation adsorbent comprise just only making the aforesaid solid-liquid separation easy to take place but also its safety when it is used for waste disposal or as valuable materials like fertilizers.

From a point of view of combined use of an adsorbent and a flocculation precipitant in the prior art, there is a report about a method wherein the adsorbent is used to recover ions or other materials from sewage or environment water, and the flocculation precipitant is then added for solid-liquid separation thereby recovering those materials, as set forth in Patent Publication 8. Thus, in the general usage of flocculation precipitant, it is added into sewage or environment water, and the purpose is waste water treatment, analysis, suspension recovery.

Further, Patent Publication 9 reports that a particulate or sheet-form adsorbent containing a slightly water-soluble ferrocyanide metal compound may be brought in contact with a treatment solution containing an inorganic polymeric flocculant and further with an alkaline treating agent having a pH value of 7 to 9 thereby holding back elution of the ferrocyanide ions used for removal of cesium.

On the other hand, the flocculation precipitant according to the present invention is quite different from these methods in terms of usage.

In the present invention, the flocculation precipitant is used during production of the adsorbent not when using it. Thereby, the adsorbent is able to make by a general solid-liquid separation/dehydration process such as centrifugation and filtration. Accordingly, the ability of the flocculation precipitant to be demanded is also different from the case where it is added to the water to be disposed together with aforesaid adsorbent.

A part of the flocculation precipitant added the metal-cyano complex slurry remains in the dehydrated metal-cyano complex cake and hence, in the adsorbent that is the final product. In other words, the flocculation precipitant should not interfere with the desired adsorption capability. More specifically, even when the flocculation precipitant is used for solid-liquid separation of the metal-cyano complex slurry, it should properly be selected depending on its application or, alternatively, it should not be selected with only solid-liquid separation capability in mind. Further in view of adsorbent management, it is desired to select a substance for which no new legal response is needed. In terms of legal requirements, conventional usage is applied to waste material disposal; however, the present method needs quite different accommodations such as legal accommodation that must be complied for delivery of the produced adsorbent, e.g., laws relating to examination and production regulation of chemical substances as well as the foreign exchange law and foreign trade control laws. In the present invention, use is made of flocculation adsorbents that accommodate to these requirements.

More specifically, the flocculation precipitant used herein comprises aluminum sulfate, poly (aluminum chloride), iron (II) chloride, polyferric sulfate, ferrous sulfate, calcium hydroxide and a polymeric flocculant among which the organic polymeric flocculant is used. In particular, an amphoteric type polymeric flocculant is more preferable, and a polymeric flocculant composed mainly of acrylamide and dimethylaminoethyl methacrylate is further preferred.

[Binder]

Usually, the metal-cyano complex is produced by mixing an aqueous solution of the raw material, and in the process, a metal-cyano complex/water mixture (called hereafter the "slurry") is obtained. In the present invention, after obtaining a metal cyano complex powder using a flocculated precipitate obtained by adding the agglomeration precipitate to this slurry, the obtained metal cyano complex powder is granulated by mixing the binder, the crosslinking agent and water.

Therefore, in order to appropriately mix the metal cyano complex powder and the binder, the binder in the present invention is preferably also water-soluble, more preferably a water-soluble polymer, and particularly preferably polyvinyl alcohol.

For appropriate mixing of the metal-cyano complex powder with the binder, therefore, the binder used herein is preferably also soluble in water; more preferably a water-soluble polymer, and particularly preferably polyvinyl alcohol. Although there is no particular limitation on the polymerization degree of the polyvinyl alcohol, it has preferably a polymerization degree of 1700 or more from a point of view of maintaining the shape of the granulated adsorbent as set forth in Patent Publication 6 in particular. There is no particular limitation on saponification degree, it is also desirable that the saponification degree is 97% or greater. However, what should be noted here is that in Patent Publication 6, any crosslinking agent is not added when producing a granulation adsorbent. In the present invention, since polyvinyl alcohol is insolubilized by the addition of a crosslinking agent, the above index is only a guide, meaning that it is possible to maintain the granulated adsorbent even with a polyvinyl alcohol having a smaller polymerization or saponification degree.

[Crosslinking Agent]

In the present invention, addition of the cross-linking agent is of extremely importance.

As described above, in order to properly mix the metal cyano complex and the binder, the binder is also water. As stated above, for appropriate mixing of the metal-cyano complex with the binder, it is desirable that the binder is also water-soluble.

Figure 2:
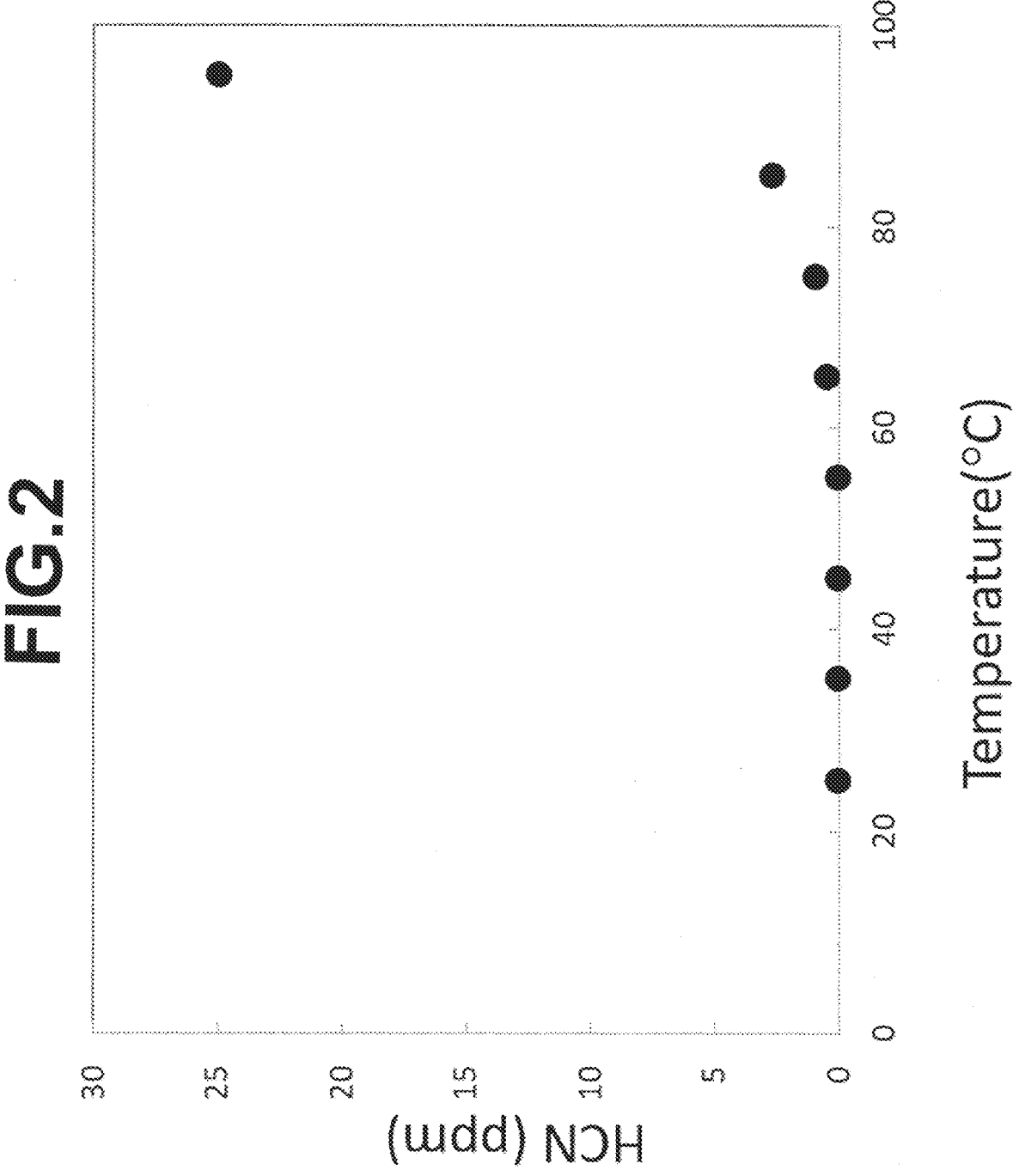
FIG. 2 shows "the temperature dependency of the in-bag HCN concentration 24 hours after CuPBA nanoparticles are sealed in an aluminum bag" shown in FIG. 11 of Non-Patent Publication 1.

When the water-soluble binder is used, however, if it comes in contact with water when using the granulated adsorbent, a problem with elution of the binder occur at that time, and it becomes difficult to maintain the strength of the granulated adsorbent. For this reason, it is of importance to add the crosslinking agent capable of making the binder insoluble. On the other hand, the crosslinking agent generally functions by way of heating, often rendering the binder insoluble. However, temperature control is in need, because some cyano groups are generally released by heating out of a portion of the metal-cyano complex, turning into hydrogen cyanide (see Non-Patent Publication 1). Accordingly, the binder and crosslinking agent used in combination should be soluble in water and capable of crosslinking at low temperature. Here note that FIG. 2 is illustrative of the "temperature dependency of the in-bag HCN concentration 24 hours after sealing of CuPBA nano-particles in an aluminum bag" shown in Non-Patent Publication 1, FIG. 11.

In the present invention, the crosslinking agent is preferably water-soluble, and it is preferable to crosslink at 70° C. or lower from the viewpoint of the temperature limit when heating the metal cyano complex. It is more preferable to crosslink at heating 60° C. or lower, and particularly preferable to crosslink at heating 50° C. or lower. From this point of view, preference is given to a titanium lactate ammonium salt, titanium lactate, and diisopropoxybis (triethanolaminato) titanium, among which the titanium lactate ammonium salt is most preferable.

The granulation adsorbent of the present embodiment may be other functions or For example, a mixture with another adsorbent such as activated carbon expands the adsorbent target, or a building member that by coating it on a building member and making it combined.

The granulated adsorbent according to this embodiment may be a mixture with other substances or a composite with other materials for adding other functions or for installation for use. For instance, a mixture with another adsorbent such as activated carbon expands the adsorbent target, or a building member coated and composited said mixture may be used for adsorption of the target substance in the location.

[Production Process of the Granulated Adsorbent]

The process of producing the granulated adsorbent according to one embodiment of this invention comprises the following steps.

1. Step of adding the flocculation precipitant into a slurry containing said metal-cyano complex and then dehydrating the slurry to prepare a metal-cyano complex dehydrated cake.

2. Step of heat drying said metal-cyano complex dehydrated cake to prepare a metal-cyano complex dried block.

3. Step of pulverizing the metal-cyano complex dried block into a metal-cyano complex powder.

4. Step of preparing a mixture containing the metal-cyano complex powder, a binder, a crosslinking agent and water, and then granulating using the mixture.

Figure 3:
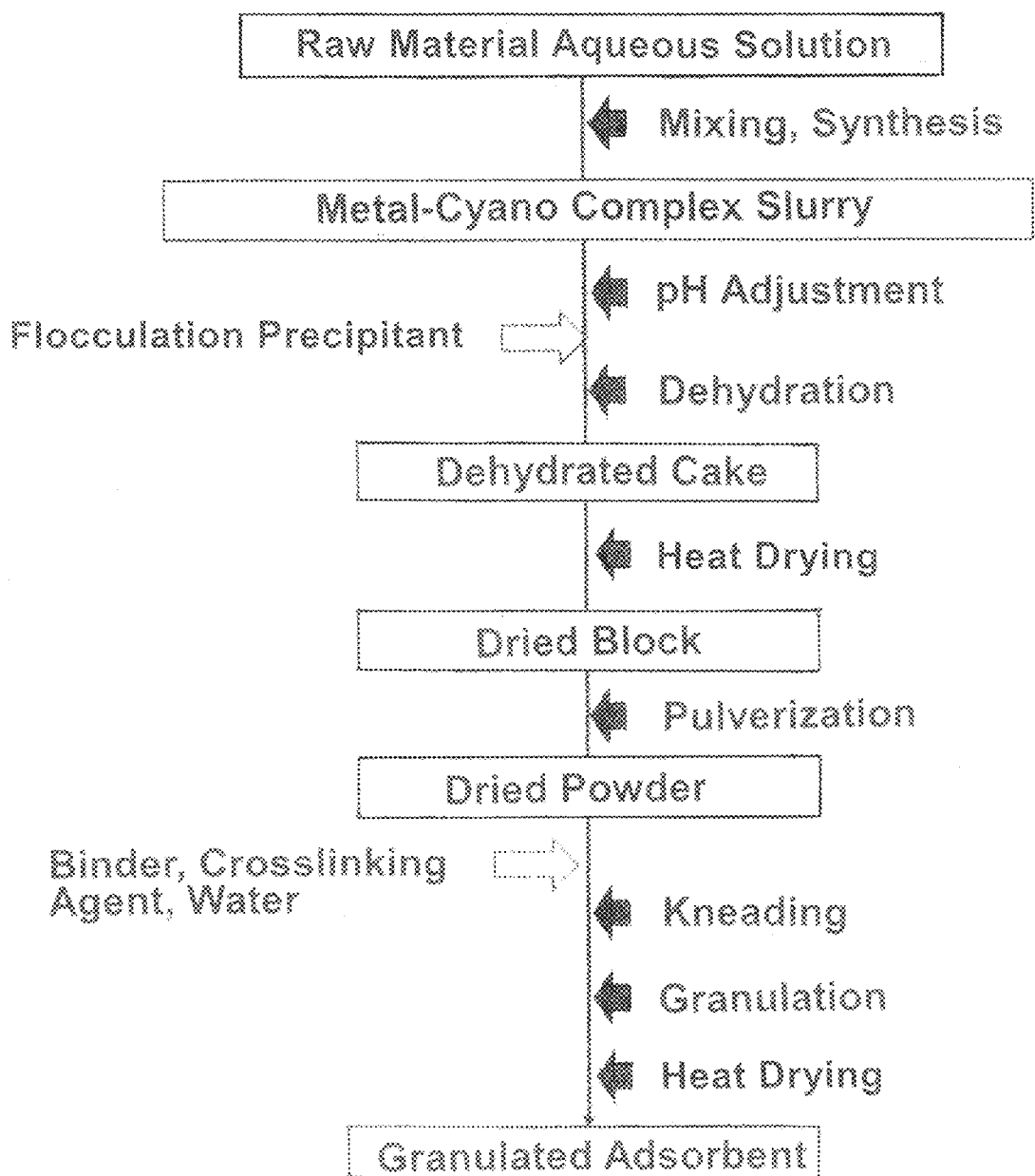
FIG. 3 shows one example of the production process of the granulated adsorbent according to the present invention.

FIG. 3 shows one example of process steps for producing the granulate adsorbent according to the present embodiment.

Specifically, the present process is characterized by how the metal-cyano complex powder is prepared. In Patent Publication 6, in all embodiments, the powder is prepared using spray drying, and is obtained as a fine powder having a particle diameter of 10 to 60 micrometers. This spray drying is characterized by being capable of increasing the specific surface area of the adsorbent, but there is a problem in terms of the need of using large scale installation for production steps, leading to increased costs.

In the present invention, this problem is solved by using a dehydration step and a heat drying step in powder production. With these steps, it is possible to reduce the size of the equipment used drastically. Here take the dehydration and drying of 10 kg/hr water as an example. Because the metal-cyan complex slurry has a solid content of about 10% as already described, a solid matter of about 1 kg/hr may be obtained by dehydration and drying of 10 kg/hr. If the solid matter is 40% (with a water content of 60%), the dehydrated cake is then obtained in an amount of 2.5 kg/hr. It is then required to convert this to a dried block of 1 kg/hr by thermal drying. The size needed for this step comes within a 1 meter×1 meter×1 meter for each of dehydration and heat drying, meaning that the necessary space is much smaller than the spray drying space.

The process for preparing the metal cyano complex slurry is not particularly limited, and a desired slurry may be prepared with an appropriate solid fraction. For instance, the process described in Patent Publication 7 and Non-Patent Publication 1 can be used.

The dehydration process in the present embodiment is not particularly limited as long as the metal cyano complex slurry is dehydrated and solid-liquid separation can be performed. Addition of the flocculation precipitant allows the metal-cyano complex slurry to be dehydrated extremely easily. Without the addition of any flocculation precipitant, since the secondary particles in the metal cyano complex slurry are about several micrometers, it is necessary to another method of solid-liquid separation removing these secondary particles in the slurry is required.

In the present invention, since the metal cyano complex becomes large enough to cause natural sedimentation due to addition of the flocculation precipitant, the selection range of the dehydration process is greatly expanded. For instance, such means as supernatant removal after spontaneous sedimentation, centrifugal dehydration, pressurized filtration (squeezing), and belt pressing may be select. However, it is not preferable to use spray drying. In spray drying, when the secondary particle size is large, it causes clogging in the nozzle, so the opposite effect is generated from increasing the secondary particle size by adding a flocculating precipitate.

In order to increase the options for dehydration process by increasing the size of the secondary particles, the flocculation precipitant is added to the metal-cyano complex slurry. As the flocculation precipitant, aluminum sulfide, polyaluminum chloride, polyferric chloride, ferrous sulfate, calcium hydroxide, polymeric flocculant, and the like can be used. It is noted that the flocculation precipitant used herein should be selected such that its elution during use does not give rise to any problem because it remains in the produced granulated adsorbent.

Further, the metal-cyano complex slurry differs in pH depending on metal species, so it is necessary to select a flocculation precipitant according to it or adjust the pH before adding the flocculation precipitant.

The heat drying process in the present invention is not particularly limited as long as the metal cyano complex dehydrated cake can be dried, and the temperature around the dehydrated cake may be raised from room temperature. However, in order to completely prevent the generation of hydrogen cyanide, the temperature is kept preferably at 70° C. or lower, more preferably at 60° C. or lower, most preferably at 50° C. or lower (see FIG. 2). In addition, it is even better if there is a ventilation function to improve the drying speed. For instance, it may be a shelf dryer, a granulation dryer, a box type dryer, a rotary dryer, a vacuum dryer, a reduced-pressure dryer, and a low-temperature dryer. It is also possible to use a device in which the dehydration function and the drying function are integrated. Further, depending on the type of dehydrator used, when the dehydrate cake is so large and not dry out, it is desired to reduce the size of each dehydration cake by cutting the dehydrated cake in advance.

For pulverizing a metal-cyano complex dried block, the secondary particle diameter of post-pulverization powder is preferably at 500 micrometers or lower, more preferably 100 micrometers or lower. There is no particular limit on the lower limit of the secondary particle size, but about 500 nanometers is practical. Although there is no particular limit on the lower limit of secondary particle diameters, about 500 nanometers is practical. However, it is here understood that a reduced secondary particle diameter often gives rise to dusting during production. Pulverization may be carried out by a cutter mill, a roll crusher, a millstone type pulverizer, a ring mill, a roller mill, a jet mill, a hammer mill, Atritor, a bead mill or the like.

Any method may be used to mix the metal-cyano complex powder, binder and crosslinking agent as long as they are fully mixed; for instance, a ribbon mixer, a cutter mixer, a screw mixer, a vibration mixer and the like may be used. It is noted that for uniform mixing and low-temperature kneading, binder dispersion spraying and crosslinking agent spraying at 500 rpm or less are effective.

There is no particular limit on how to granulate mixtures if granulated adsorbents having any desired particle diameter are obtainable; for instance, pan granulation, drum granulation, extraction granulation, and agitation granulation may be used.

EXAMPLES

The present invention will now be explained in further details based on several examples; however, it should be understood that the present invention is not limited thereto.

Example 1

Figure 4:
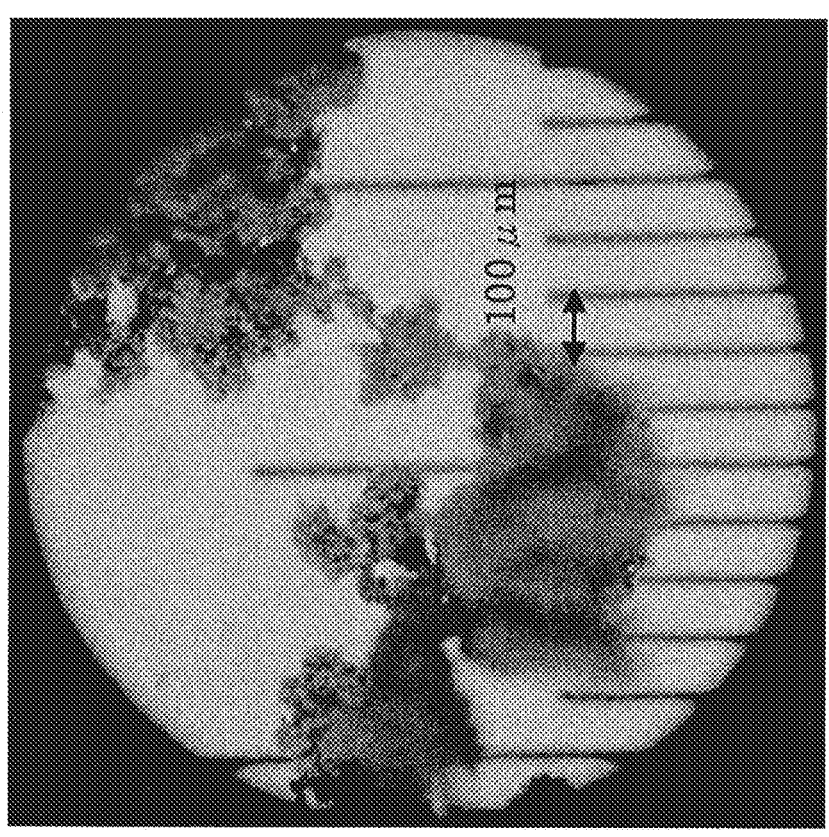
FIG. 4 is the microscopic photographs taken of the metal-cyano complex powder obtained in Example 1 at a drying temperature of not higher than 40° C. and a water content of 5% or lower, with the right being a partially enlarged photograph thereof.
Figure 4:
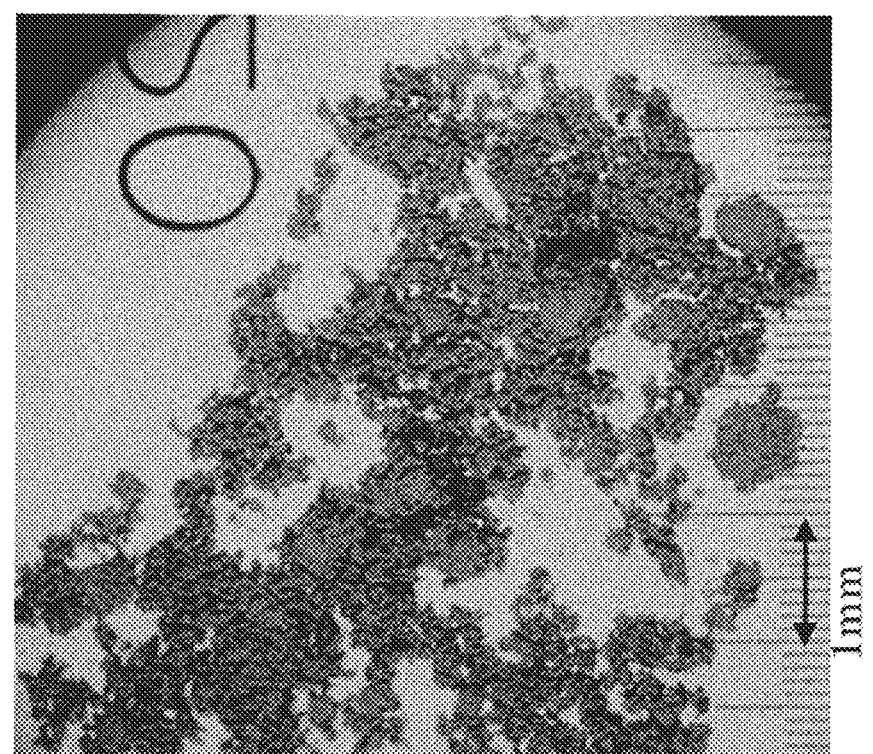

A granulated adsorbent A1 for ammonia gases was synthesized by way of the process steps as shown in FIG. 3.
1. Preparation of Raw Material Aqueous Solution For the raw material aqueous solution, 7.77 moles of copper sulfate pentahydrate were dissolved in 9.25 kg of water to prepare 10 liters of an aqueous copper sulfate solution LC1, and 4.24 moles of potassium ferrocyanide trihydrate were dissolved in 8.15 kg of water to prepare 9 liters of an aqueous potassium ferrocyanide solution LF1.
2. Synthesis of Metal-Cyano Complex Slurry LD1 and LF1 were mixed together to prepare a copper iron-cyano complex slurry S1, where $M=Cu^{2+}$ and $M=Fe^{2+}$.
3. Addition of Flocculation Precipitant After pH adjustment of slurry S1, 24 grams of an organic polymeric flocculant composed mainly of an acrylamide/dimethylaminoethyl methacrylate copolymer having a molecular weight of about 4,000,000 were added to the slurry and stirred by an agitator.
4. Production of Dried Block Slurry S1 was pressed with an electric oil pressing machine (YS-1 manufactured by Hashida Kiko Co. Ltd.) for solid-liquid separation to provide dehydrated cake C1. After cutting the dehydrated cake C1 into small pieces of about 3 cm square, it was dried at 40° C. for 24 hours with a shelf dryer to prepare a dried block B1.
5. Pulverization of Block to Fine Powder, Addition of Binder and Crosslinking Agent, and Kneading The dried block B1 was pulverized using a cutter mixer (BLIXER-6 made by FMI Co., Ltd.) to obtain dried powder DP1. During this process, it was confirmed that the temperature of the cutter mixer did not exceed 40° C. FIG. 4 are photographs of dried powder DP1 in which the right one is a partially enlarged photograph thereof.

Separately, a 10% by weight aqueous solution of a polyvinyl alcohol was prepared as the binder and titanium lactate ammonium salt was prepared as the crosslinking agent. Without removing DP1 from the cutter mixer, binders and crosslinkers were added to DP1 in order. The cutter mixer was actuated for one minute for stirring to obtain wet powder WP1 in which a copper iron cyano-complex, flocculation precipitant and cross-linking agent were kneaded together.
6. Granulation and Drying Wet powder WP1 were charged in an extrusion granulator (F-5 made by Dalton Co., Ltd.) to obtain a water-containing granulated adsorbent WA1 which was then dried by a shelf drier at 50° C. for 24 hours to obtain a granulated adsorbent A1 for ammonia gas.

Example 2

A granulated adsorbent A2 for ions (cesium ions and ammonium ions) was prepared apart from the above. It is here understood that the adsorbents for ammonia gas and the adsorbents for ions have different mixing ratios of copper sulfate and potassium ferrocyanide. For this reason, the granulation adsorbent for ion can be obtained by changing the preparation of the raw material aqueous solution described in 1 in the manufacturing process of the granulated adsorbent for ammonia gas. More specifically, 6.6 moles of copper sulfate pentahydrate were dissolved in 9.36 kg of water to prepare 10 liters of an aqueous copper sulfate solution LC2 as the raw material aqueous solution, and 4.4 moles of potassium ferrocyanide trihydrate were dissolved in 9.16 kg of water to prepare 10 liters of an aqueous potassium ferrocyanide solution LF2. LC2 and LF2 were then used to obtain a granulated adsorbent A2 for ions via a step similar to the adsorbent for ammonia gas.

Example 3

Granulated adsorbent A1 for ammonia gas was used to carry out ammonia gas adsorption testing. 40 grams of granulated adsorbent A1 for ammonia gas were weighed out and then filled up in a 30 mm φ vinyl chloride tube to prepare a column. Subsequently, an ammonia-containing air having an ammonia concentration of about 600 ppm was passed through the column at a flow rate of 15.5 L/min. An ammonia concentration before and after the column was measured using a detector tube (3M·3L made by GASTEC Corporation).

Figure 5:
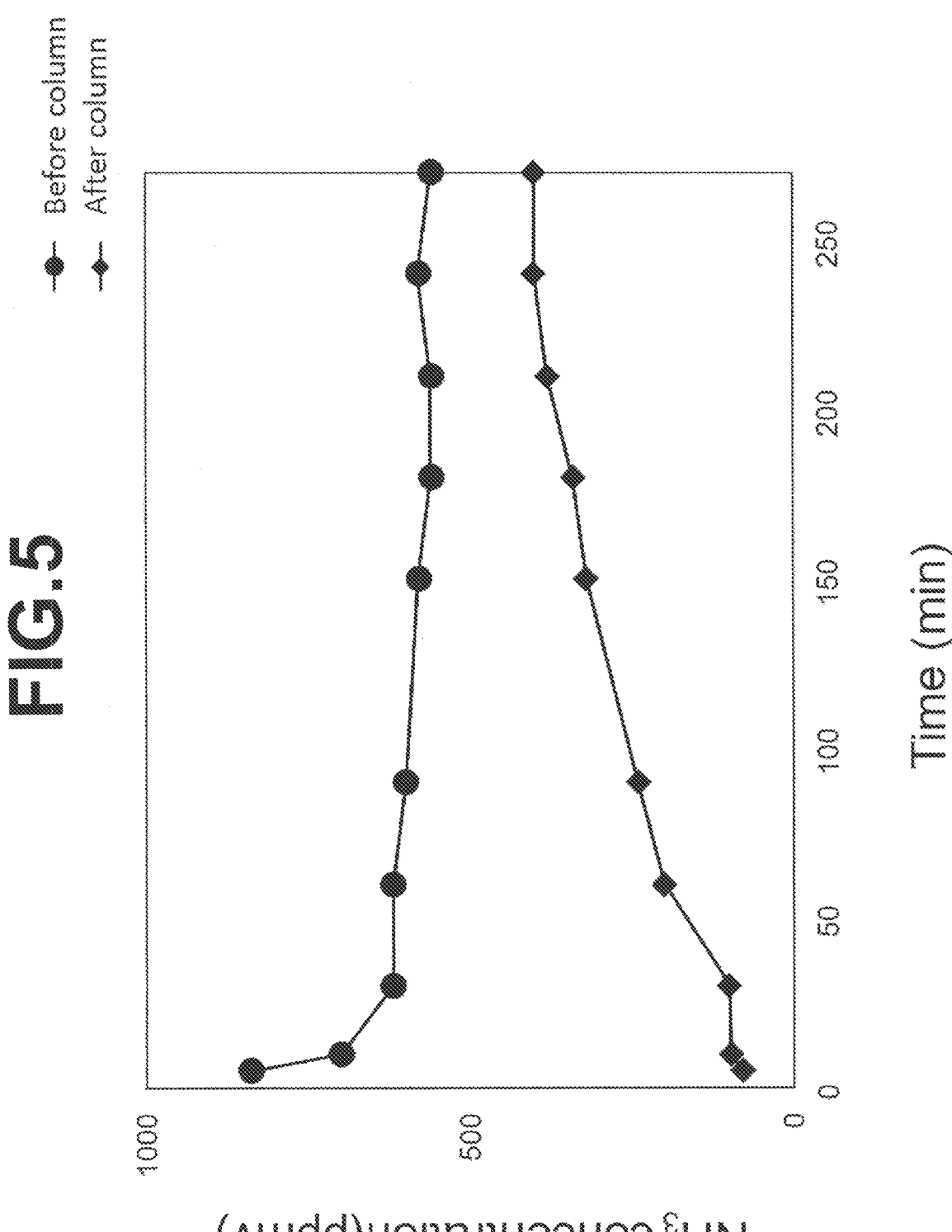
FIG. 5 shows ammonia concentrations before and after passage of ammonia-containing air through a column filled up with a granulated adsorbent A1 for ammonia gas.

FIG. 5 shows an ammonia concentration before (–●–) and after (–◆–) the column measured during passage of an ammonia-containing air through the column filled up with granulated adsorbent A1 for ammonia gas.

The ammonia concentration before the column remained at approximately 600 ppm, but the ammonia concentration after the column could initially be reduced down to 100 ppm and maintained sufficiently at a value lower than before the column even after a lapse of 250 minutes or longer. From this, it has been found that the granulated adsorbent for ammonia gas prepared in Example 1 is capable of sufficient ammonia gas adsorption.

Example 4

In this example, evaluation was made of relations of the temperature at which the granulated adsorbent was produced with respect to the generation of hydrogen cyanide gas. The hydrogen cyanide in the cutter mixer had a concentration of 5 ppm or lower as measured in Step 5 of Example 1. This was lower than the allowable concentration recommended by JSOH. On the other hand, the hydrogen cyanide had a concentration of 25 ppm in the apparatus as measured after the interior temperature of the cutter mixer was increased to 73.7° C. by extending the kneading time. It has thus been shown that an increasing temperature during work leads to the generation of hydrogen cyanide.

Example 5

To evaluate the adsorption power of granulated adsorbent A2 for ions, batch shaking tests were carried out. 100 mg of granulated adsorbent A2 were weighed out, then charged in 10 mL of an aqueous ammonium chloride solution, and then shaken in a shaker for 24 hours at 600 rpm. The aqueous ammonium chloride solution had a concentration adjusted to 100, 500, 1000, and 400 mg-$NH_4$/L, respectively. Thereafter, the resulting liquid was filtered through a filter having a pore size of 0.45 micrometer to prepare a sample liquid which was then evaluated the ammonium ion concentration by ion chromatography, to prepare an adsorption isotherm.

Figure 6:
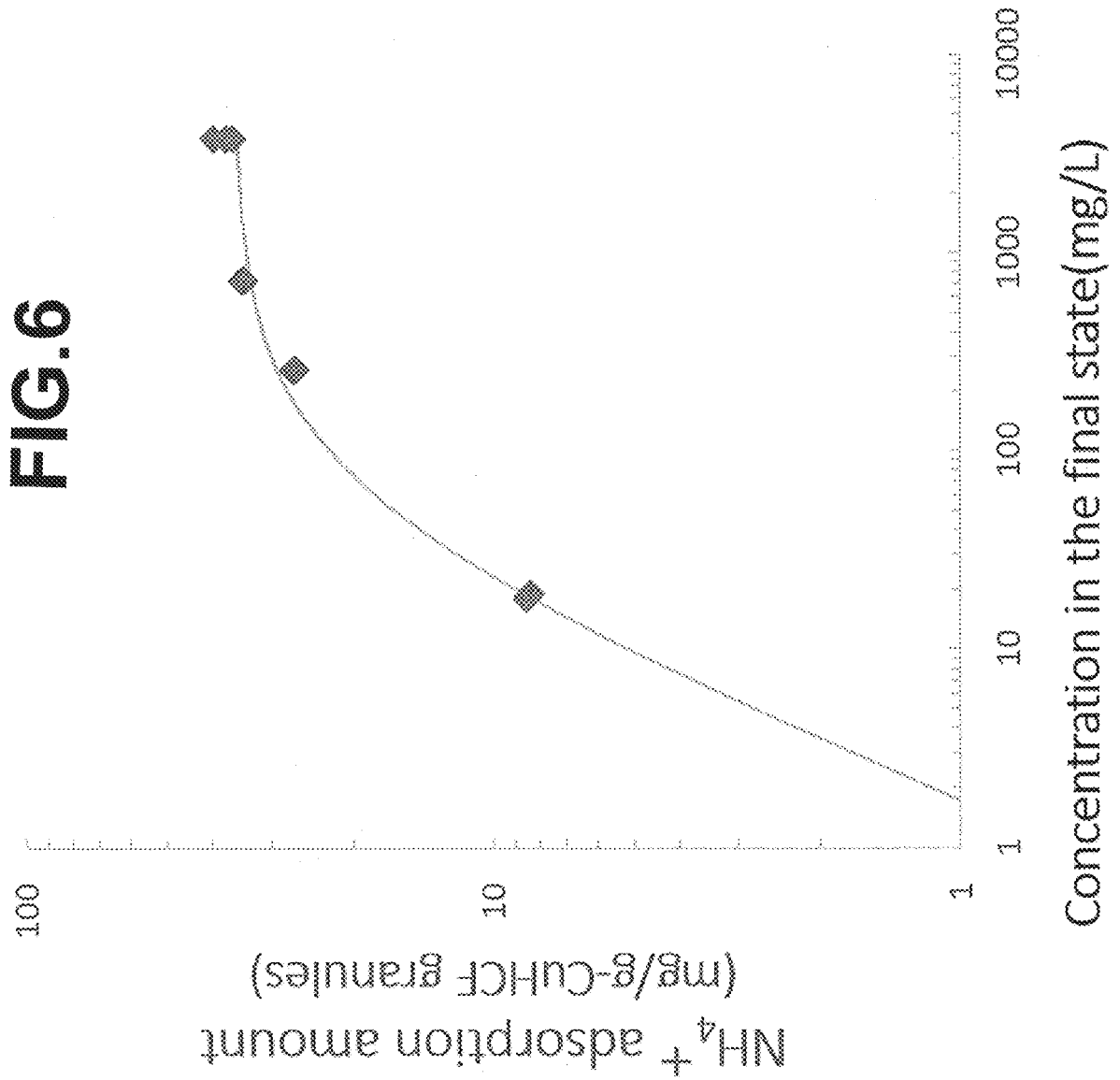
FIG. 6 is an ammonium ion adsorption isotherm of granulated adsorbent A2 for ions.

FIG. 6 is indicative of the adsorption isotherm of granulated adsorbent A2 for ions.

As a result, it has been found that the granulated adsorbent produced by the inventive process is capable of sufficient ammonium ion adsorption. For instance, when the ammonium ion concentration was 20 mg/L in the test liquid or about 20 mg/kg (water), the concentration of ammonium ions in the adsorbent was about 9 mg/g or 9000 mg/kg (adsorbent). This shows that the concentration of ions in the adsorbent is about 450 times as high as the concentration of ions in water, and that the adsorbent is capable of sufficient adsorption.

Example 6

The cesium ion adsorption capability of granulated adsorbent A2 was evaluated as in Example 5. In this case, an aqueous cesium chloride solution was provided in place of the aqueous ammonium chloride solution at a concentration of 10, 50, 100, 500, 1000, and 5000 mg/L. The cesium ion concentration was measured by inductively coupled plasma mass spectroscopy.

Figure 7:
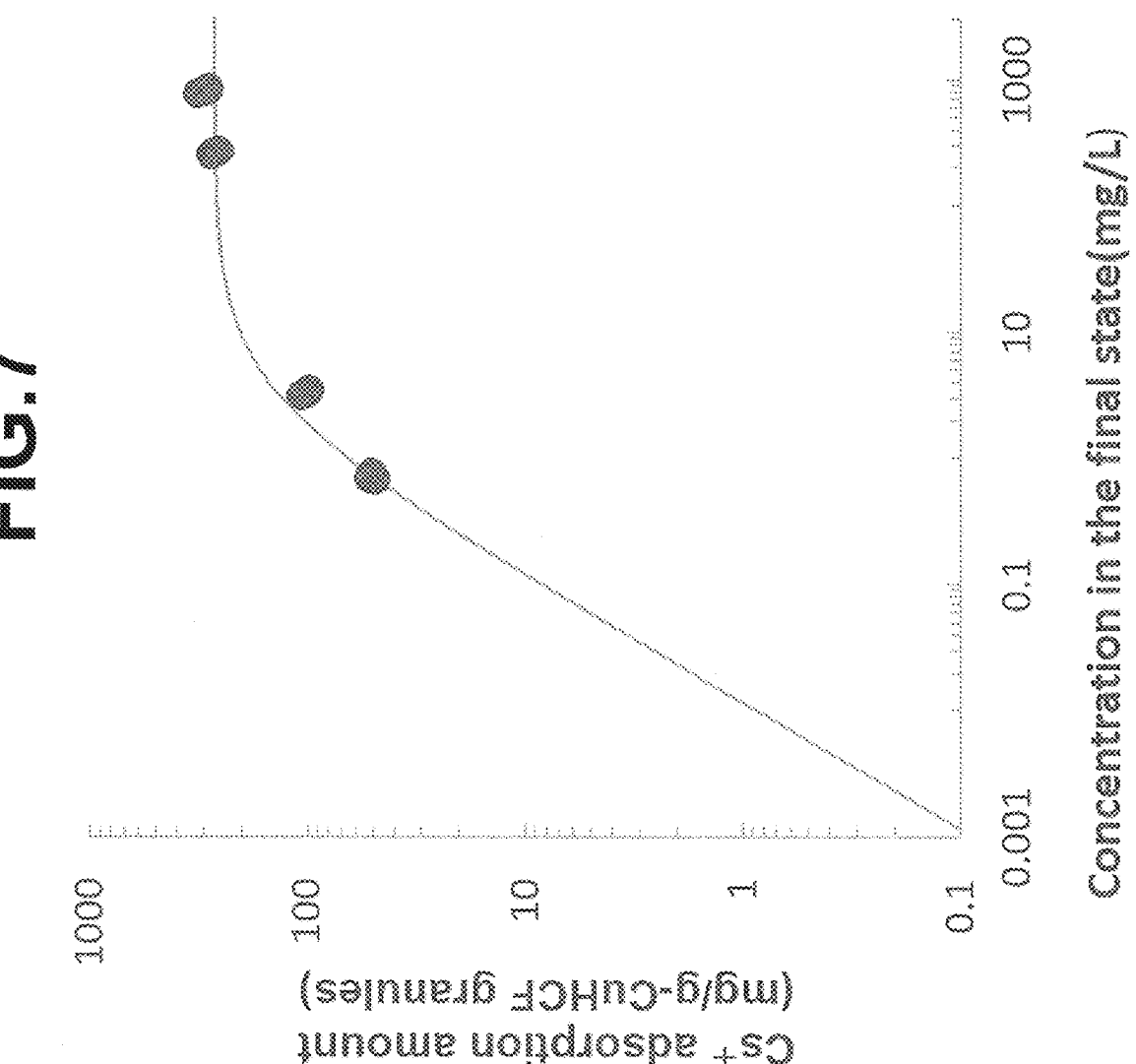
FIG. 7 is a cesium ion adsorption isotherm of granulated adsorbent A2 for ions.

The adsorption isotherms are shown in FIG. 7, indicating that this adsorbent is also capable of sufficiently high cesium ion adsorption as well as ammonium ions.

From these results, it was found that a granulation adsorbent sufficiently exhibiting ammonia gas and ion adsorption ability can be produced by the method of the present invention without realizing a small secondary particle size by using a spray drying method or the like.

From these, it has been found that according to the present invention, it is possible to produce a granulated adsorbent capable of sufficient ammonia gas and ion adsorption without a spray drying method or the like for realizing small secondary particle diameters. In addition, it was found that the generation of harmful hydrogen cyanide can be prevented by temperature control during production processes.

INDUSTRIAL APPLICABILITY

The adsorbent according to the invention was granulated, so that it can be more easily handled compared with powder. The process of producing adsorbents according to the invention can provide an adsorbent capable of sufficient adsorption without using any spray drying or similar process which might give rise to an increased equipment size and, hence, an increased cost. The present process also makes temperature control simple during production and safety control easy during work. The resulting granulated adsorbent can be used for adsorption of ammonia gas, ammonium ions, cesium ions or the like, and for waste water disposal, waste gas disposal, and predisposal for environmental estimations.

What is claimed is:

1. A granulated adsorbent for adsorption of a small ion and/or a small molecule, comprising:
   a metal-cyano complex as an effective component,
   a flocculation precipitant for flocculation and precipitation of said metal-cyano complex from a slurry containing said metal-cyano complex,
   a binder, and
   a crosslinking agent,
   wherein said flocculation precipitant is an organic polymeric flocculant, and said cross-linking agent is an organic titanium salt.

2. The granulated adsorbent according to claim 1, wherein said organic polymeric flocculant is an amphoteric polymeric flocculant.

3. The granulated adsorbent according to claim 1, wherein said binder is a water-soluble polymer.

4. The granulated adsorbent according to claim 3, wherein said binder is a polyvinylalcohol.

5. A process of producing a granulated adsorbent of claim 1 comprising a metal-cyano complex as an effective component for adsorption of a small ion and/or a small molecule, comprising:

a step of adding a flocculation precipitant into a slurry containing said metal-cyano complex, and then dehydrating said slurry to prepare a metal-cyano complex dehydrated cake, a step of heat drying said metal-cyano complex dehydrated cake to prepare a metalcyano complex dried block, a step of pulverizing said metal-cyano complex dried block into a metal-cyano complex powder, and a step of preparing a mixture containing said metal-cyano complex powder, a binder, a crosslinking agent, and water, and then granulating using said mixture.

6. The process of producing a granulated adsorbent according to claim 5, wherein all the steps are carried out at not higher than 70 to inhibit generation of hydrogen cyanide.

7. The process of producing a granulated adsorbent according to claim 5, wherein said step of preparing said mixture is carried out by dispersing and injecting said binder and spraying said crosslinking agent without recourse to high-speed stirring.

8. The process of producing a granulated adsorbent according to claim 5, wherein a polymeric flocculant is used as said flocculation precipitant.

9. The process of producing a granulated adsorbent according to claim 5, wherein a water-soluble polymer is used as said binder.

10. The process of producing a granulated adsorbent according to claim 9, wherein a polyvinyl alcohol is used as said water-soluble polymer.

* * * * *